United States Patent [19]

Jaffe

[11] 4,289,653

[45] Sep. 15, 1981

[54] COMULLED SILICA-ALUMINA BASE DENITRIFICATION CATALYST

[75] Inventor: Joseph Jaffe, Berkeley, Calif.

[73] Assignee: Chevron Research Company, San Francisco, Calif.

[21] Appl. No.: 91,304

[22] Filed: Nov. 5, 1979

Related U.S. Application Data

[63] Continuation of Ser. No. 968,589, Dec. 11, 1978, abandoned.

[51] Int. Cl.$^3$ .............................................. B01J 21/12
[52] U.S. Cl. ................................ 252/453; 252/455 R
[58] Field of Search ........................... 252/453, 455 R

[56] References Cited

U.S. PATENT DOCUMENTS

| | | | |
|---|---|---|---|
| 2,872,410 | 2/1959 | Erickson | 252/453 X |
| 2,908,635 | 10/1959 | Ogorzaly | 252/453 X |
| 3,496,116 | 2/1970 | Anderson et al. | 252/453 |
| 3,661,805 | 5/1972 | Horvath | 252/465 |

Primary Examiner—Carl F. Dees
Attorney, Agent, or Firm—D. A. Newell; S. R. LaPaglia; C. L. Hartman

[57] ABSTRACT

An extruded silica-alumina base catalyst is prepared by cogelling a silica sol solution containing aluminum and having a pH in the range of about 1–3. The cogelled silica-alumina is peptized to form an extrudable dough and may be mulled with Group VI-B and Group VIII metals to prepare a denitrification catalyst extrudable composition.

4 Claims, No Drawings

COMULLED SILICA-ALUMINA BASE DENITRIFICATION CATALYST

This is a continuation of application Ser. No. 968,589, filed Dec. 11, 1978, and now abandoned.

BACKGROUND OF THE INVENTION

1. Field of the Invention

This invention relates to an improved silica-alumina composite. More particularly, the invention relates to an extruded silica-alumina base catalyst exhibiting surprisingly little deactivation in the dentrification of petroleum feedstocks.

2. Prior Art

The prior art teaches a plethora of methods useful in the manufacture of silica-alumina composites. Such composites may be prepared for use as catalysts per se or as catalyst supports. Silica-alumina composites have been commercially embraced for a variety of process applications, such as cracking, desulfurization, demetallation, and dentrification of petroleum feedstocks.

The variety of manufacturing techniques presented in the art, which have been recognized as patentably distinct modifications, attest to the fact that the final catalyst properties are highly dependent upon the precise method of manufacture. Such variety, with seemingly subtle differences, is also an indicia of the unpredictability of catalyst manufacturing procedures in general. The change of a single step to another apparently equivalent step may result in a more desirable pore structure, increased activity, lower deactivation rates, higher crush strengths or a totally worthless product. Despite major advances in the art, as exhibited by great numbers of new emerging catalysts, the effect upon the final catalyst of changing a single step cannot be predicted with certainty, and thus most catalyst research continues by laborious trial and error.

Numerous prior art references teach that the combinations of metals, their oxides and sulfides, from Group VI-B and Group VIII of the Periodic Chart are useful for desulfurization and dentrification. Such metals may be impregnated upon preformed bases or supports, such as alumina and silica-alumina supports, by immersing the base in a solution of the metals. Alternatively, the metals may be precipitated or cogelled with the base. Heretofore, the deposition of metals by precipitation or cogellation was considered to be superior to impregnation of the metals on the base, since the latter method tended to produce non-uniform deposits of active metals. The increased costs of production inherent in cogellation or precipitation over impregnation were simply borne in order to obtain a more uniform product.

A unique method of preparing mulled catalyst extrudates based on silica-alumina cogels has been discovered which results in preparation of a hydrodenitrification catalyst having substantial advantages over the prior art impregnated catalysts and equivalent to the prior art cogelled or precipitated catalysts. In particular, the catalyst exhibits a deactivation rate of approximately one-fifth that of similar commercial catalysts.

SUMMARY OF THE INVENTION

In one of its broad aspects, the present invention embodies an extrudable silica-alumina composition, which is prepared by mixing an alkali metal silicate solution with an aqueous aluminum salt solution and an acid, such as sulfuric acid, to form an acidified silica sol having a pH in the range of about 1 to 3; adding a basic precipitant, such as ammonium hydroxide, to said acidified silica sol to form a cogelled mass of silica-alumina hydrogel; washing the gelatinous mass; mulling the washed gelatinous mass with a peptizing agent to form an extrudable dough; and extruding said dough. The extruded dough may be dried and calcined to form a silica-alumina catalyst for a silica-alumina support onto which desired metals may be impregnated. Although strong acids such as nitric acid may be used for the peptizing agent, the weaker acids are preferred, such as propionic, formic, and, in particular, acetic acid. If desired, the gelatinous mass may be dried such as by spray-drying prior to mulling, to facilitate the control of batch mixing operations. Furthermore, in a preferred embodiment of the invention, a Group VI-B compound and a Group VIII compound are added to the gelatinous mass for extrusion with the dough. A preferred Group VI compound is ammonium heptamolybdate and a preferred Group VIII compound is nickel carbonate for this process. After extrusion, the extrudates are dried and calcined to form the finished catalyst. A particularly preferred alkali metal silicate solution comprises sodium silicate solution and a particularly preferred aluminum salt is aluminum sulfate.

DETAILED DESCRIPTION OF PREFERRED EMBODIMENTS

In accordance with the present invention, an acidified silica sol is prepared from an alkali metal silicate solution, an aluminum salt solution and a strong mineral acid. A preferred alkali metal silicate solution, suitable for use in the claimed invention, is sodium silicate solution or water glass. Commercial preparations of sodium silicate solution are available with an $Na_2O$ content of about 8.9 weight percent and an $SiO_2$ content of about 28.7 weight percent, based upon the weight of total solution. A preferred aluminum salt solution may be prepared by dissolving aluminum sulfate in water and a preferred acid for use in the sol preparation is sulfuric acid, although other aluminum salts such as aluminum chloride and other acids such as acetic acid may be used.

As is well known in the art, silica may be prepared by mixing a sodium silicate solution with acid to form a silica hydrogel. "Hydrogel" as used herein may be defined as a coagulated colloid with an imbibed liquid phase. The resulting silica hydrogel may be slurried with aluminum hydroxide gel for the preparation of commercial alumina-silica composites. If the pH in the acidulation step of the sodium silicate solution is maintained below 3, however, a silica hydrogel is not formed, but a colloidal solution or sol is obtained. As used herein, a "sol" may be defined as a colloidal dispersion or suspension of a metal oxide in a liquid. The present invention requires that a silica sol be inititally prepared as opposed to a silica hydrogel. This may be accomplished in a number of ways; however, a preferred method comprises adding an aqueous sodium silicate solution to an aqueous solution of aluminum sulfate and sulfuric acid with vigorous mixing. Sufficient acid is used to maintain the pH of the resulting sol in the range of 1 to 3. This is accomplished by adding excess acid over the stoichiometric quantity of acid required to neutralize the alkali content of the sodium silicate. At this pH, the desired sol appears as a clear homogeneous liquid solution to the eye, since the colloidal silica particles are generally less than 0.2 micron in diameter.

Addition of the sodium silicate solution to the aqueous mixture of aluminum sulfate and sulfuric acid is preferred to insure formation of the sol under acidic conditions. The reverse technique of adding a sulfuric acid-aluminum sulfate solution to the silicate solution may be used with vigorous stirring, but tends to result in premature hydrogel formation, and is thus less desirable.

Aluminum sulfate solutions in the range of 20 to 30% aluminum sulfate by weight and sodium silicate solutions in the range of 5 to 10% $SiO_2$ by weight are satisfactory for the sol preparation.

A basic precipitant such as ammonium hydroxide is then added with the acidified sol solution to a bath maintained at a constant pH. The addition of the precipitant raises the pH of the sol above 3, resulting in cogelling the silica and alumina species. Preferably the cogellation is carried out at a constant pH of approximately 4.0 to 6.0 to avoid the highly viscous mixture which occurs in the pH range of approximately 3 to 4 and to obtain the desired surface area. Simultaneous formation of the aluminum and silicon species assures maximum interdispersion of the species without reliance upon mechanical mixing. Sufficient quantities of precipitant should be added at the end of the cogellation to obtain a final pH in the range of 7.5 to 8.5 to insure completeness of reaction. It is preferable to use an ammonium hydroxide solution having a concentration of 10 to 20% $NH_3$ by weight for the gellation step. It is also preferred that the gellation be carried out at a temperature in the range 75° C. to 90° C. to insure completeness of reaction and for facilitating the subsequent filtration steps.

The resulting cogelled mass of silica-alumina hydrogel is then filtered from the mother liquor and water-washed to remove the sodium sulfate ions. Some sulfate ion exchange may be achieved by washing with a dilute aqueous ammonium hydroxide solution, sufficient to maintain the wash-water pH between 7.5 and 8.0. The cogel should be aged for approximately 5 hours at a temperature of about 90° C. and the aged cogel may be spray-dried for convenience in handling and storage, or may be further processed to the final catalyst from the moist state. In the latter method, the cogel is air-dried to a moisture content of approximately 70% and mixed with a peptizing agent in a muller mixer. An example of such a muller is the commercially available Simpson Mix-Muller.

Peptizing agents useful in the present invention include the strong acids such as hydrochloric acid and nitric acid. Much preferred, however, are the weak acids such as formic acid, propionic acid and, in particular, acetic acid. Acetic concentrations from 5 to 10 weight percent, based upon the weight of solids, have been discovered to be particularly effective.

If the extrudate composition fed to the muller is in the dry form, such as spray-dried powders, sufficient water should be added with the acetic acid to produce a moisture content of approximately 60% by weight. After mulling for approximately 1 hour, the material will attain a plastic or doughy state which is suitable for extrusion in commercial extrusion apparatus.

If desired, the material may be extruded, dried and calcined to produce a silica-alumina catalyst or catalyst support. The preferred method of drying and calcining includes an initial drying step in an air-purged oven at 65°–175° C. and a final calcination at 510° C. for 0.5–5 hours in a furnace or kiln.

However, the present process is highly desirable for the direct production of an extrudable catalyst composition, particularly for those catalysts having Group VI and Group VIII metals dispersed in a silica-alumina base. Such catalysts find wide use in desulfurization, demetallation, denitrification and hydrocracking. Ammonium heptamolybdate and nickel carbonate powder are particularly suitable Group VI-B and Group VIII metal compounds for mixing with the extrudable dough. Other Group VI-B metal compounds, that is, compounds of molybdenum, tungsten and chromium include molybdic acid, molybdic anhydride, ammonium chromate, chromium acetate, chromous fluoride, chromium nitrate, tungstic acid, ammonium metatungstate, etc. Other Group VIII metal compounds which may be employed, that is, compounds of iron, nickel, cobalt, platinum, palladium, ruthenium, rhodium, osmium and iridium, include nickel nitrate, nickel acetate, cobaltous nitrate, cobaltous acetate, ferric nitrate, platinum chloride, palladium chloride, and the like. The moisture content of the dough should, of course, be adjusted to maintain a proper volatiles content upon addition of the metal compounds.

The extrusion operation is suitably effected with commercial extrusion equipment such as the auger or ram-type apparatus which force the dough through a perforated plate or die. The extrudate may be cut into particles of desired length prior to drying and calcining by means of a rotating knife as the extrudate emerges from the die plate. Alternatively, the extrudate may be broken into rods of random length during the drying and calcining process. In any case, the extrudate is dried and calcined, drying being usually accomplished at temperatures up to about 200° C. for a period of several hours and calcining being preferably effected in an oxidizing atmosphere, such as air, at a temperature of from about 315° C. to about 650° C. over a period of from about 0.5 to about 6 hours.

EXAMPLES

The following examples are given to illustrate the superiority of catalysts prepared in accordance with the present invention when compared with conventionally prepared catalysts of similar composition.

TABLE I

| Catalyst | A | B | C | D | E | F |
|---|---|---|---|---|---|---|
| $Al_2O_3/SiO_2$, weight ratio | 75/25 | 70/30 | 70/30 | 75/25 | 70/30 | 70/30 |
| Ni, wt. % | 6.1 | 5.0 | 4.3 | 4.1 | 5.3 | 5.5 |
| Mo, wt. % | 16.0 | 17.3 | 15.7 | 15.8 | 15.8 | 14.5 |
| P, wt. % | 2.37 | 0 | 0 | 0 | 0 | 0 |
| Particle density, gm/cm$^3$ | 1.20 | 1.21 | 1.10 | 1.13 | 1.07 | 1.42 |
| $N_2$ area, m$^2$/gm | 219 | 217 | 249 | 255 | 181 | 271 |
| Fouling rate, °C./hr | | | | | | |
| Test I | 0.021 | | 0.021 | | | |
| Test II | 0.019 | 0.056 | | 0.015 | 0.017 | |
| Test III | 0.042 | | | | | 0.008 |

Catalysts A–F, as shown in Table I, were tested to determine catalyst performance in denitrification service. In Test I, Catalysts A and C were contacted with a 0.934 specific gravity, 260°–470° C. boiling-range California gas oil having a 2660 ppm by weight organic nitrogen content, at a liquid hourly space velocity of 0.5 per hour, a pressure of 96 atmospheres, and a hydrogen gas rate of 890 cubic meters per cubic meter of feed. The effluent treated oil had a nitrogen content of 0.4 ppm. In Test II, Catalysts A, B, D and E were contacted with a 0.940 specific gravity, 260°–455° C. boiling-range California coker gas oil, having a 6900 ppm organic nitrogen content, at a liquid hourly space velocity of 0.5 per hour, a pressure of 113 atmospheres and a hydrogen gas rate of 1600 cubic meters per cubic meter of feed. The effluent treated oil had a nitrogen content of 0.4 ppm. In Test III, Catalysts A and F were tested under the conditions of Test II, except that the pressure was lowered to 106 atmospheres to accelerate fouling. In all tests, the catalysts were presulfided by conventional methods after catalyst loading of the reactor.

Catalyst A is a commercial hydrodenitrification catalyst prepared from a conventional silica-alumina extrudate impregnated with nickel, molybdenum and a phosphorus promoter in the proportions indicated. If the phosphorus promoter is not included in the catalyst, the fouling rate is significantly increased. This increased fouling rate is readily observed from a comparison of Catalyst A with Catalyst B, which was prepared in a similar manner, but without the phosphorus promoter. In Test II, Catalyst B suffered fouling at a rate approximately 3 times the rate observed for Catalyst A.

Catalyst C was prepared by impregnating a cogelled silica-alumina base, made in accordance with the teachings of the present invention, with nickel and molybdenum. To cogel the base, a dilute solution of sodium silicate containing the equivalent of 270 grams of $SiO_2$ was vigorously mixed with a second solution of aluminum sulfate and sulfuric acid containing the equivalent of 630 grams of $Al_2O_3$. Sufficient excess acid was added to maintain the mixture below a pH of 3.0, thus ensuring the formation of a clear silica sol. The sol was metered into a stirred hot-water bath controlled at a temperature of about 88° C. simultaneously with a dilute ammonium hydroxide solution in sufficient quantities to raise the mixture pH to about 4.5. A cogelled slurry of alumina and silica precipitated from solution and, at the end of cogellation, sufficient ammonium hydroxide was added to raise the pH to approximately 8. The cogelled slurry of alumina and silica was filtered to produce a cake which was subsequently washed substantially free of impurities and reslurried with hot water at a temperature of about 88° C. for a period of approximately 5 hours. The slurry was again filtered and dried to a volatiles content of about 70 weight percent in an oven. The moist, partly dried, filter cake was mulled with 35 grams of nitric acid to a plastic or doughy state and extruded. The resulting silica-alumina extrudates were dried at 80° C. and calcined at 510° C. to form a base suitable for metals impregnation. Nickel and molybdenum solutions were then impregnated into the calcined extrudate. After impregnation, the loaded extrudate was dried and activated at a temperature of 455° C. to produce Catalyst C.

Although Catalyst C was prepared by impregnation to metal levels comparable to Catalyst A, the catalyst was observed to perform in Test I at the same fouling rate as Catalyst A without benefit of phosphorus promoter. This result is surprising, and can logically be attributed to the method of base preparation.

Catalysts D and E of Table I were prepared on a semi-commercial scale substantially in accordance with the procedure set forth for the preparation of Catalyst C, except that the alumina-silica cogel was spray-dried to a powder form prior to peptizing and extrusion. Each of the catalysts was impregnated without phosphorus and is demonstrated by the fouling rates shown in Test II to be clearly superior to the prior art Catalyst B and at least equivalent to or better than the promoted Catalyst A.

In the manufacture of Catalyst F, the cogelled, spray-dried, silica-alumina powder, prepared in accordance with the teachings of the present invention, was peptized with a dilute solution of acetic acid and mulled to form an extrudable paste or dough. Ammonium heptamolybdate powder and nickel carbonate powder were added and comulled with the dough to form a mix, which was extruded, dried at 120° C. and calcined at 510° C.

Catalyst F was tested in denitrification service and the surprising results are shown in Test III. Catalyst F exhibited a fouling rate approximately one-half the fouling rates of Catalysts D and E, even under the more severe testing conditions. Furthermore, the catalyst exhibited a fouling rate approximately one-fifth the fouling rate of commercial Catalyst A, which also employed a phosphorus promoter to decrease fouling. Such results are quite surprising and clearly indicate the superiority of the present catalyst over the catalysts of the prior art.

What is claimed is:

1. An extruded silica-alumina catalyst prepared by the method which consists essentially of the following steps:
   mixing a sodium silicate solution with an aqueous aluminum sulfate solution and sulfuric acid to form an acidified silica sol in an alumina salt solution having a pH in the range of about 1 to 3;
   adding sufficient ammonium hydroxide to said acidified silica sol in the aluminum salt solution to form a cogelled mass of silica and alumina under substantially constant pH conditions and at a pH of at least 4;
   adding additional ammonium hydroxide to the cogelled mass to obtain a pH in the range of 7.5 to 8.5;
   washing the cogelled mass;
   mulling the cogelled mass with a peptizing agent, a Group VI-B metal compound and a Group VIII metal compound to form an extrudable dough;
   extruding said dough;
   and drying and calcining the extruded dough.

2. An extruded silica-alumina catalyst as recited in claim 1, wherein said Group VI-B metal compound is ammonium heptamolybdate and said Group VIII metal compound is nickel carbonate.

3. An extruded silica-alumina catalyst as recited in claim 1, wherein said peptizing agent is acetic acid.

4. An extruded silica-alumina catalyst as recited in claim 1, prepared by the method further comprising spray-drying the washed cogelled mass prior to the mulling step.

* * * * *